Sept. 7, 1943.    G. S. RADFORD    2,328,998
ATTRITION PRODUCT AND METHOD FOR MAKING SAME
Filed Dec. 27, 1939    2 Sheets-Sheet 1

INVENTOR
George S. Radford
BY
ATTORNEY

Sept. 7, 1943. G. S. RADFORD 2,328,998
ATTRITION PRODUCT AND METHOD FOR MAKING SAME
Filed Dec. 27, 1939 2 Sheets-Sheet 2
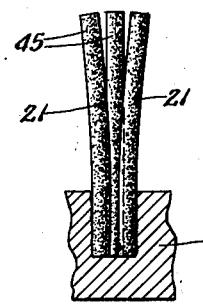
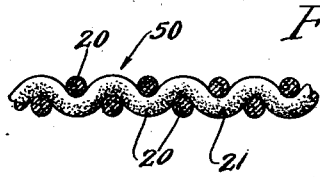
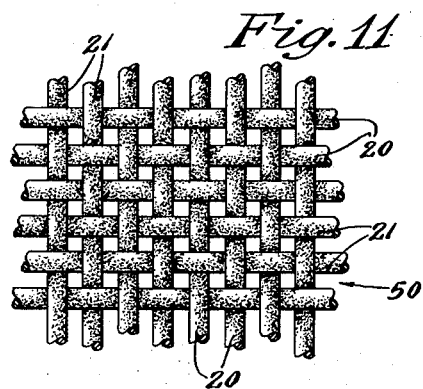
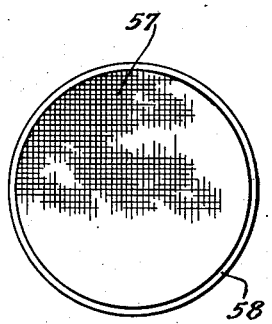
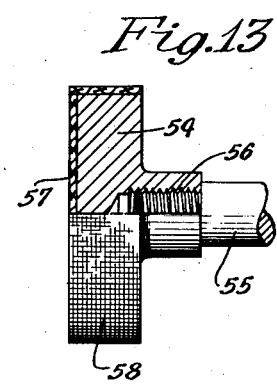
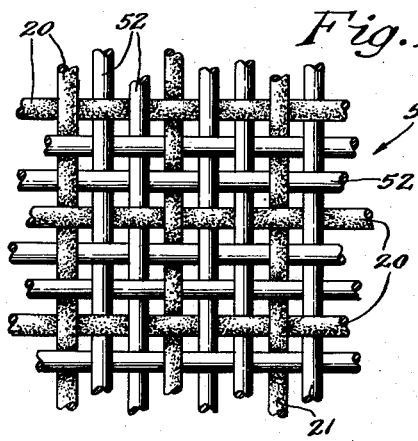
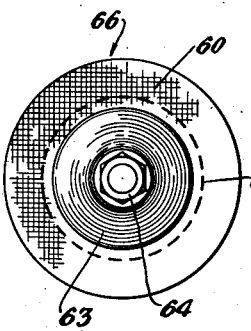
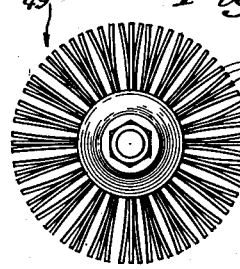
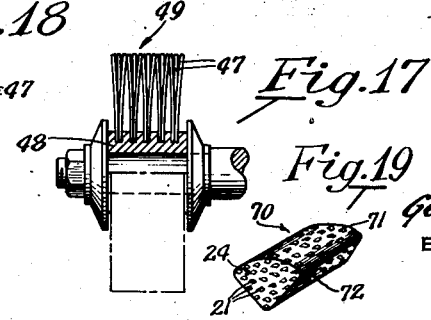
INVENTOR
George S. Radford
BY Feyrer and Mack
ATTORNEY Patented Sept. 7, 1943

2,328,998

UNITED STATES PATENT OFFICE 2,328,998

ATTRITION PRODUCT AND METHOD FOR MAKING SAME

George S. Radford, Norwalk, Conn.

Application December 27, 1939, Serial No. 311,070

14 Claims. (Cl. 51—185)

The present invention relates to improvements in attrition products and methods of making the same.

Heretofore most attrition products consisted primarily in coatings of abrasive material adhesively secured to base members, of cloth, paper, leather and/or other material. Such structures very often resulted in a rather superficial holding of the abrasive so that the attrition products usually have a very short life. For example: (1) Sandpaper and emery cloth include a coating of glue or the like with granules of abrasive spread thereon; (2) toothbrush bristles carry mild abrasive tooth powder loosely thereon, or depend upon water to hold; (3) polishing wheels usually include leather facing covered with glue or the like upon which the abrasive is superposed; (4) rag wheels for buffing include a superficial coating of wax and rouge applied to the outer surface thereof. Other examples might be given to show the weaknesses of prior proposals.

It is an object of the present invention to provide attrition products in the form of filaments, sheets, discs, strips, wheels and in other forms which would have the characteristic of carrying or holding the abrasive materials much better than such products heretofore proposed.

A feature resulting from the attainment of this objective is the provision of filaments having abrasive integrally formed therewith.

It is a very important object of the present invention to provide attrition material intimately embodied in filament, strips, sheets and other shapes at the time such are made, and having a continuously and substantially uniform wearing quality.

Features resulting from the attainment of this objective include the provision of filaments or other shapes of a plastic base material (such, for example, as cellulose, colloidal, crystalloid or like material) with abrasive or attrition material: (1) thoroughly comingled throughout the same, (2) carried only in the center or core of the filament or other shape, (3) carried in a form of a sheath only at the exterior of the filament or other shape (not in the core or center thereof).

There has always been an extensive need for abrasive and polishing devices, and it is an important object of the present invention to provide improved devices of this character. Features resulting from the attainment of this objective include the provision of: (1) abrasive brushes, the bristles of which may be provided throughout or substantially throughout with attrition material; (2) cloth polishing wheels, with the cloth discs forming the same, made in whole or in large part with filaments having abrasive thoroughly comingled therein; (3) a felt with intermingled abrasive filaments therein; (4) cutting or polishing filaments or strips of irregular shape to advantageously fit into grooves, recesses and the like of irregular shape; (5) polishing strips or the like for hand use or for mounting upon suitable holders for use in machines in the form of a fabric having at least some of the filaments entirely or substantially filled with attrition or abrasive material.

Other objects and features will hereinafter appear.

In the drawings:

Fig. 9 is an enlarged fragmentary section of a brush with bristles provided by the present invention.

Fig. 10 is a fragmentary sectional view of the fabric made in accordance with the present invention.

Fig. 11 is a plan view of the fabric shown in Fig. 10.

Fig. 12 is a plan view of fabric, similar to that shown in Fig. 11, but with alternate abrasive and nonabrasive strands.

Fig. 13 is a front view, partially in section, of a hard polishing wheel and disc.

Fig. 14 is a side view of the device shown in Fig. 13.

Fig. 15 is a front view, partially in section, of a rag polishing wheel.

Fig. 16 is a side view of the polishing wheel shown in Fig. 15.

Fig. 17 is a front view, partially in section, of the brush or bristle wheel.

Fig. 18 is a side view of the wheel shown in Fig. 17.

Fig. 19 is a perspective view of an irregularly shaped abrasive filament.

Fig. 20 is a diagrammatic view of apparatus for making the present attrition product in strip or sheet form.

Before describing the present improvements and mode of operation thereof in detail it should be understood that the invention is not limited to the details of construction and arrangement of parts shown in the accompanying drawings, which are merely illustrative of the present preferred embodiments, since the invention is capable of other embodiments, and the phraseology employed is for the purpose of description and not of limitation.

Figure 1:
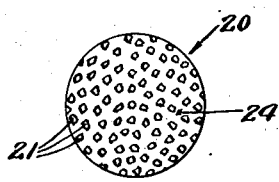
Figure 1 is an enlarged end view of one form of filament provided by the present invention, with attrition material comingled throughout.
Figure 2:
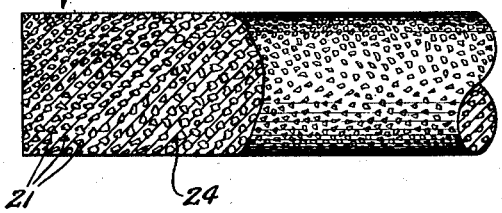
Fig. 2 is a fragmentary and sectional side view of the filament shown in Fig. 1.

Referring now in detail to the drawings and first to that form of the invention shown in Figs. 1 and 2, there is disclosed a filament 20, preferably made of a synthetic material such as a cellulose ester (e. g., cellulose acetate, nitrocellulose), resin (e. g., urea formaldehyde resin, phenolic formaldehyde resin, glyptal resin), polymers (e. g., Nylon). Nylon is particularly desirable in forming the filaments of the present invention and may be made as disclosed in one or more of the following United States patents: 1,995,291, 2,012,267, 2,071,250, 2,071,251 and 2,130,948. Likewise, the patent literature contains many illustrations of cellulose ester, and resin solutions which may be forced through spinnerettes to form filaments (e. g., United States Patents 1,884,289, 2,035,939, 2,140,274, British Patent 305,468, etc.). Such synthetic material, in its initial state or prior to being formed into a filament, is herein generally referred to as a plastic base material. In this form of the invention (Figs. 1 and 2) it should be noted that the filament 20 has attrition material or abrasive 21 thoroughly comingled throughout. Thus, it serves very effectively to hold abrasive and to continuously provide new cutting surface as the filament wears down.

One method of making this filament 20 is to make the plastic base material of synthetic material (e. g., those hereinbefore set forth) into the usual initial plastic mass and then to thoroughly mix a suitable quantity of the abrasive 21 therein. After this has been accomplished the mixture, plastic synthetic material with abrasive therein, may be forced through a suitable spinnerette, or spinnerettes, in the well-known manner to form the filament into a square, round or any other desired shape. One filament-forming apparatus 22 for this purpose is briefly shown in Fig. 7 which includes a chamber 23 for accommodating the plastic base material 24 which may be backed with a suitable plunger 25 manually or automatically operated to squeeze the mixture of plastic base material 24 and abrasive 21 from the chamber 23 through the opening 26 to form the filament 20. Thereafter, the filament may be congealed or hardened by exposure to the air, contact with a liquid solution, or in any of the suitable and well-known ways of hardening the particular synthetic material used.

Figure 3:
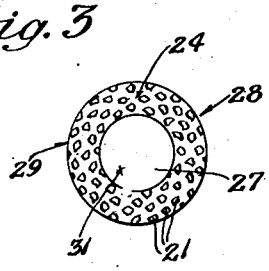
Fig. 3 is an enlarged end view of a modified form of filament provided by the present invention, with a plain core and with attrition material comingled with the external sheath thereof.
Figure 4:
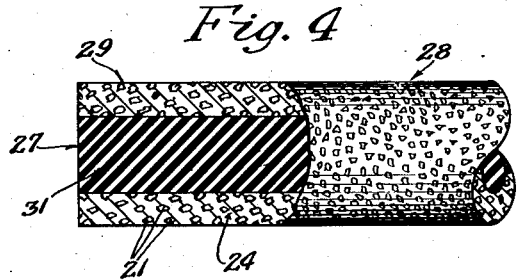
Fig. 4 is a fragmentary and sectional view of the filaments shown in Fig. 3.

Figs. 3 and 4 disclose a modified form of the present invention, differing from that form shown in Figs. 1 and 2 primarily in the provision of a nonabrasive core, center or filament 27 for the complete filament 28, with sheath or shell 29 on said core having abrasive 21 thoroughly comingled in the sheath. The core may be made of synthetic material such as the plastic base material of the filament 20 in Figs. 1 and 2; or, it may be in the form of a separate filament or strand of unlike material; or may even be a previously formed thread or cord made of any of the well-known natural fibrous materials such as cotton, hemp, wool or the like.

Figure 8:
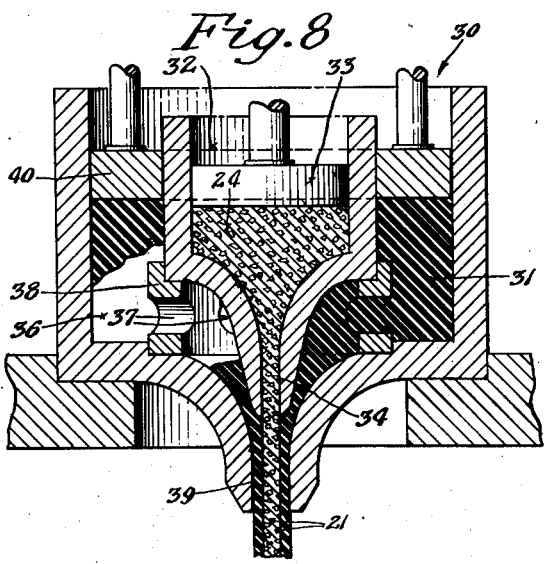
Fig. 8 is a fragmentary view of an apparatus for use in making the filament shown in Figs. 3 through 6, inclusive.

Center filaments or cores 27 of the type shown in Figs. 3 and 4 may be made in the apparatus 30 shown in Fig. 8. Plastic base material 31 for the core 27 may be placed in the chamber 32 and may be forced from the chamber with a plunger 33 whereby it will be expelled from an orifice 34. Concurrently plastic base material 24 containing abrasive 21 may be forced from a chamber 36 through suitable openings 37 in a spacing collar 38, thence downwardly through an orifice 39 to envelope the core 27 which is concurrently being extruded from the orifice 34. Thus, a filament is formed with a non-abrasive core 27 and with an abrasive sheath 29 surrounding the same.

Alternatively, the plunger 33 may be removed from the chamber 32 and a previously formed thread, cord or string of cotton, hemp, wool, rayon or ony other material may be passed through the orifices 34 and 39. Thereafter the plastic mixture 24 with abrasive 21 may be forced from the chamber 36 by a plunger 40 as explained hereinbefore. As it is forced downwardly in the chamber and outwardly through the orifice 39 it will have a tendency to grip and pull the thread or cord downwardly through the orifice 34 from a suitable supply.

Figure 5:
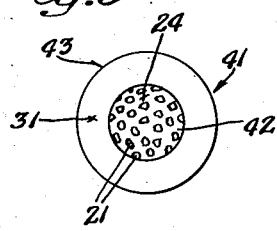
Fig. 5 is another modified form of filament provided by the present invention, with the attrition material carried only in the center or core thereof.
Figure 6:
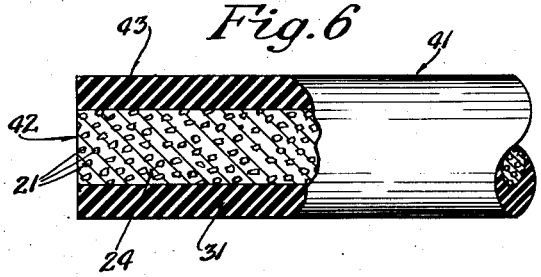
Fig. 6 is a fragmentary and sectional view of the filament shown in Fig. 5.

Figs. 5 and 6 show a further modified form of the present invention closest to that form shown in Figs. 3 and 4, but differing from the latter primarily in the provision of a filament 41 having a core or center filament 42 with abrasive 21 and with a sheath 43 therearound with no abrasive. This form of the invention may be made reversing the procedure just set forth in connection with the filament 28 of Figs. 3 and 4; viz., plain (nonabrasive) plastic base material 31 is placed in and forced from the outer chamber 36 by the plunger 40 to form a sheath 43 of nonabrasive material, while a plastic base material 24 with abrasive 21 is placed in and forced from the inner chamber 32 to concurrently form an abrasive center or core 42 within the sheath 43. For certain types of polishing, cutting or like operations the filament 41 is preferred to the filaments 20 and 28.

Any of the filaments 20, 28 and 41 may be made in very long or practically endless lengths. They may later be cut to short strands, bristles or the like if preferred.

Of particular importance the filaments may be made in a wide number of sizes, as will be readily appreciated, and may contain a large or small amount of almost any preferred type of abrasive or polishing agent. According to the plastic base material used the filaments may be made soft or stiff and can be made to wear down slowly or fast to expose new cutting edges or cutting grains. The latter action can with this invention be accelerated by the use of suitable solvents as a wash (e. g., acetone, for the cellulose filaments).

The filaments 20, 28 and 41 so made may be used to make a variety of vastly improved attrition products such as: emery cloth, toothbrushes, polishing brush wheels, rag wheels, etc.

In this latter connection attention is first directed to Figs. 9, 17 and 18. Fig. 9 is a fragmentary showing of a brush used for polishing, wearing down, imparting special ornamental finishes to articles, or for other purposes. For example, it may be the small fragment of a toothbrush with bristles 45 (short lengths of filaments 20, 28 or 41) secured to or imbedded within a suitable base 46 in any of the usual and well-known ways. The bristles in such a brush may have abrasive therein which is somewhat coarser than that in the usual tooth pastes and powders, to be used, say once or twice a week, by a smoker, to easily remove tobacco stain or yellow discoloration which is ordinarily not removable except by dentists.

Small hand brushes for general washing purposes, for scouring pans, for scouring bathtubs, wash basins and the like, and for manifold other cleaning, polishing and finishing operations may also be made by merely making the base 46 of a suitable or preferred size and shape, e. g., like the many sizes and shapes of hand brushes now in general use) and provided with the preferred bristles 45 and abrasive 21.

Similarly, bristles 47 (short lengths of filaments 20, 28 or 41) may be secured in a generally radiating position and in the usual and well-known manner in a base 48 in the form of a circular hub, to make a brush wheel 49 (see Figs. 17 and 18). Such wheels are used extensively in industry, for example, to impart a scratch or brush finish to brass, copper and other articles.

When a quick or coarse cutting, polishing, finishing or like function is desired with any of the brushes of the tooth, hand or wheel type hereinbefore described, or the like, the bristles 45 or 47 are preferably stiff (as by being made of comparatively large diameter, or by use of a plastic base material which dries hard and/or stiff, and with the use of a comparatively coarse abrasive). Conversely, when a fine polish or finish is desired relatively flexible bristles 45 or 47 and fine abrasive 21 are used.

As the ends of the bristles 45 or 47 in any of the brushes or hand wheels wear down new abrasive is exposed to do the polishing or other function, thus presenting a continuously new cutting and polishing surface. This is an important characteristic of all forms of the present invention.

Other particularly advantageous aspects of the present invention are shown in Figs. 10 through 16, inclusive, which discloses a new and very advantageous type of abrasive fabric, and various products made with the same.

Referring first to Figs. 10 and 11, there is shown an abrasive flat fabric 50 made entirely with abrasive filaments, such as the filaments 20, 28 and/or 41 hereinbefore described in detail, which may be interwoven in any of the well-known ways of making cloth or fabric. For most purposes such fabric is preferably made with the filaments 20 and/or 28 so that the side or flat surface thereof has exposed abrasive 21.

Fig. 12 shows a slightly modified form of abrasive fabric 51 in which only alternate or occasional strands or filaments 20 are of the abrasive type and others interwoven are nonabrasive filaments 52.

These fabrics 50 and 51 may be used by hand in place of sandpaper and emery cloth (which have abrasive superficially secured to the face of a paper or fabric) to cut down, polish or finish wood, metal and other articles. In such use it is very often held onto or secured to a hand block. Similarly the fabrics 50 or 51 may be glued or otherwise secured to polishing wheels or discs to be driven by a suitable spindle. Figs. 13 and 14 illustrate one form of such use, including a wheel 54 (or head) secured to a spindle 55 as by a thread connection 56 with a disc facing 57 of fabric 50 or 51. The same wheel 54 may also have a peripheral facing 58 of the fabric 50 or 51. These facings 57 and 58 may be used for performing any of the many well-known operations usually performed with polishing wheels.

Wheels faced with fabric 50 or 51 provided by the present invention have a long useful life because the plastic base material securely holds the abrasive for a long period of time and keeps presenting new abrasive as the filaments are worn down or back.

Most present day polishing wheels which have facings including abrasive superficially held by glue or the like on the face thereof have the disadvantage of allowing much of the abrasive to be quickly removed therefrom, or to heat the glue and cause it to adversely glaze the wheel. The facings provided by the present invention hold the abrasive securely for a long time and do cause an adverse glue glaze.

The term abrasive (and abrasive fabric) as used herein refers to coarse cutting materials such as emery or the like and to very fine polishing materials such as talc, pumice, rouge and the like.

The abrasive fabric provided by the present invention (e. g., 50 of Figs. 10 and 11 and 51 of Fig. 12) may be used most advantageously in making polishing wheels, generally referred to as "rag wheels" and used normally to impart a fine high polish to articles. Figs. 15 and 16 disclose one such embodiment and include discs 60 of fabric 50 and/or 51 which may be held together as by stitching 61 or by flanges 62 and 63 clamped against the sides thereof as by a nut 64 on a polishing spindle 65.

The rag wheel 66 may be made: entirely with discs 60 taken from fabric 50 with all-abrasive strands (e. g., filaments 20, 28 or 41); from a combination of the foregoing (fabrics 50 and 51); either or both of the foregoing with fully plain fabric discs. The particular combination is determined largely by the polishing or finishing effect desired.

Previously proposed rag wheels usually necessitated the use of rouge sticks, or the like (wax or grease with fine abrasive), the use of which was inconvenient and which dirtied the face of the wheel and dirtied the product. The latter often necessitate special washing operations.

Rag wheels provided by the present invention, and hereinbefore described in detail, overcome all of these disadvantages.

The abrasive filaments provided by the present invention may be used to make divers other products. For example, they may be cut into staples (short lengths) and thoroughly intermingled with the wool, fur, cotton and/or the like which are normally used to make felt. Thus, a batch of wool may have a substantial quantity of short lengths (e. g., 20% to 50% by volume, a larger volume being possible if the filaments are fabricated according to the teachings in my Patent 2,110,371 dated March 8, 1938, which impart added felting characteristics thereto) of the abrasive filaments provided by the present invention thoroughly mixed therewith, and then may be compressed or felted together, in the usual and well-known manner, into a sheet or strip of felt to make an abrasive felt or fabric.

The filaments of Figs. 1 through 6 may be of large and/or small size, and may be in divers shapes, other than the round shape shown, by imparting the desired configurations to the orifices (or spinnerettes) from which the filaments are formed. For example, a filament 70 of irregular shape may be made by shaping or forming it (e. g., from plastic 24 and abrasive 21) with an oval wall 71 and with V-shaped walls 72 (see Fig. 19). Such a filament, or strip, is advantageous for polishing fillets, notches and other sections of gun, typewriter, camera, machine and other parts, and many other things. Similarly, a small thin strip of rectangular form may be formed to be used as a dental polishing floss or tape. Consequently, the term filament as used herein is intended to describe flexible round, square, rectangular and irregular shaped products of substantial length.

The plastic materials, such as cellulose, derivatives, nylon, and the like, carrying abrasive comingled therewith have the characteristic of being yielding and flexible, and are therefore particularly advantageous for many of the uses to which products such as those disclosed herein are used.

The formaldehyde resin of the type herein used may be of the thick oil soluble type (e. g., Bakelite varnish) which does not require substantial heat for hardening and which are somewhat flexible in their final form.

Short lengths or pieces, of the abrasive filaments such as 21, 28, 41 and 70, or of any other preferred form or shape thereof, may advantageously be placed in a tumbling barrel with articles which are to be finished, in order to cut down rough edges or to otherwise polish or finish the exterior of the articles. They continuously and uniformly present the same type of abrasive to the articles while the plastic material of the abrasive pieces are being worn down.

Fig. 20 discloses a mass of the comingled plastic material 24 and abrasive 21 being rolled or forced through a set of rolls 75 such as well-known calender rolls to form the same into a sheet 76 with thoroughly intermingled abrasive. The latter may be cut into squares or any other shape to be used like sandpaper or emery cloth, for example, or may be cut into narrow strips for divers purposes.

Figure 7:
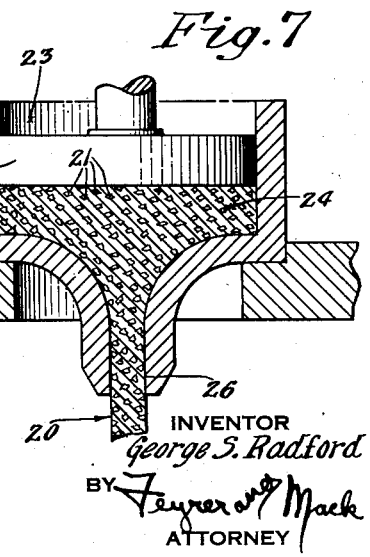
Fig. 7 is a fragmentary view of one form of apparatus used for making the filament, such as that shown in Figs. 1 and 2.

Figs. 7 and 8 are merely diagrammatic or schematic representations of one form of apparatus used for making the round, square, rectangular and other forms or shapes of abrasive filaments or strips, of the present invention. Extruding apparatus of the type used for making Celanese, rayon and other filaments, or other well-known pressing apparatus with suitable spinnerette or die orifices may be used.

Variations and modifications may be made within the scope of this invention, and portions of the improvements may be used without others.

Having thus described the invention, what is claimed as new is:

1. A new article of manufacture consisting of a cellulose filament; and abrasive comingled and thoroughly imbedded completely throughout the filament.

2. A new article of manufacture consisting of a plurality of discs of flat uncoated woven fabric at least some of the strands of which have abrasive extruded therein; and means superposing and holding said uncoated discs one upon the other.

3. A new article of manufacture consisting of a flat woven fabric at least some of the strands of which are made of a synthetic cellulose material and which are thoroughly loaded with abrasive.

4. A new article of manufacture including at least one member of flat fabric; and at least some extruded plastic filaments woven in said flat fabric and having abrasive comingled and extruded in said filaments.

5. A new article of manufacture including at least one circular disc of flat woven fabric; and at least some molded plastic filaments in said flat woven fabric; and abrasive molded within at least certain of said molded plastic filaments.

6. A new article of manufacture including a plurality of extruded plastic filaments all of which are loaded with abrasive; and a plurality of said filaments united into a flat fabric.

7. A component for buffing wheels and the like consisting of a plain extruded filaments of plastic material; and abrasive loaded filaments of plastic material united with the plain filaments.

8. An attrition component for buffing wheels, and for other attrition devices and purposes including an extruded filament of cellulose plastic material; and abrasive extruded and comingled within said filament.

9. The method of making an attrition article which includes the steps of extruding filaments with abrasive therein; and uniting said filaments with abrasive therein into a flat and flexible fabric.

10. The method of making an attrition article which includes the steps of making filaments; imbedding abrasive in at least some of said filaments; and subsequently weaving said filaments into a flat woven attrition fabric.

11. The method of making an attrition component which includes the steps of making filaments; imbedding abrasive in at least some of said filaments; uniting said filaments with abrasive imbedded therein into a flat fabric; and shaping said flat fabric into at least one flat circular disc.

12. The steps of making an attrition member which includes the steps of making a plastic mixture; adding abrasive thereto; extruding said plastic and abrasive mixture into filaments; and uniting said filaments with abrasive into a flat fabric.

13. An attrition article comprising a plurality of superposed discs of flat, uncoated, flexible fabric, including strands having at least a part of the normal main bodies thereof of synthetic macromolecular structural material and having the main bodies thereof with a normally smooth exterior surface; and abrasive with said synthetic macromolecular structural material in the normal body and within the normally smooth exterior surface of at least certain of said strands.

14. An attrition article comprising at least one flat, uncoated, flexible fabric member, including strands having at least a part of the normal main bodies thereof of synthetic macromolecular structural material and having the main bodies thereof with a normally smooth exterior surface; and abrasive with said synthetic macromolecular structural material in the normal body and within the normally smooth exterior surface of at least certain of said strands.

GEORGE S. RADFORD.